United States Patent
Fischer

(10) Patent No.: US 6,877,485 B2
(45) Date of Patent: Apr. 12, 2005

(54) METHOD AND DEVICE FOR CONTROLLING AN INTERNAL COMBUSTION ENGINE

(75) Inventor: Wolfgang Fischer, Gerlingen (DE)

(73) Assignee: Robert Bosch GmbH, Stuttgart (DE)

(*) Notice: Subject to any disclaimer, the term of this patent is extended or adjusted under 35 U.S.C. 154(b) by 56 days.

(21) Appl. No.: 10/308,390

(22) Filed: Dec. 2, 2002

(65) Prior Publication Data

US 2003/0131822 A1 Jul. 17, 2003

(30) Foreign Application Priority Data

Dec. 1, 2001 (DE) .......................................... 101 59 016

(51) Int. Cl.$^7$ ................................................. F02B 3/00
(52) U.S. Cl. ..................................... 123/472; 123/299
(58) Field of Search ................................. 123/435, 434, 123/472, 294, 299

(56) References Cited

U.S. PATENT DOCUMENTS

| | | | |
|---|---|---|---|
| 5,070,836 A | * 12/1991 | Wahl et al. | 123/299 |
| 5,277,165 A | * 1/1994 | Matsuo | 123/492 |
| 6,672,278 B2 | * 1/2004 | Zimmermann et al. | 123/299 |

FOREIGN PATENT DOCUMENTS

DE            39 29 747         3/1991

* cited by examiner

*Primary Examiner*—Bibhu Mohanty
(74) *Attorney, Agent, or Firm*—Kenyon & Kenyon

(57) ABSTRACT

A method and a device for controlling an internal combustion engine are described. The control time for a first partial injection is increased, starting out from a value of zero at which an injection does not occur. A variable that characterizes the ignition delay is measured, and a limit value of the control time is ascertained, at which the variable characterizing the ignition delay no longer substantially changes.

6 Claims, 4 Drawing Sheets

METHOD AND DEVICE FOR CONTROLLING AN INTERNAL COMBUSTION ENGINE

FIELD OF THE INVENTION

The present invention relates to a method and a device for controlling an internal combustion engine.

BACKGROUND INFORMATION

German Patent No. 39 29 747 describes a method and device for controlling an internal combustion engine, where the time of the control during which pre-injection has occurred is ascertained. This ascertained, minimum time is used to correct the control.

In the case of a method and a device for controlling an internal combustion engine, where a control time of a partial injection is corrected on the basis of a comparison of a first variable to a setpoint value, in which case the first variable characterizes the curve of the partial injection, it is thereby possible to correct the pre-injection amount in a very precise manner during the operation of the engine. Errors that are based on manufacturing tolerances and/or aging effects of the engine and injection system may be compensated to the greatest possible extent. It is particularly advantageous that the procedure is not only implementable in particular operating states, but is also possible in nearly all operating states. In particular, a correction is possible in the case of different rail pressures, engine speeds, and loads.

It is especially advantageous when the first variable characterizes the start of combustion of the main injection. The ignition delay, i.e. the time between the start of combustion and the start of the corresponding injection, is an important variable that influences the noise emissions.

The correction is particularly advantageous in the pre-injection, since in this case, small deviations caused by tolerances have a large effect.

The evaluation of the signal of an ionic-current sensor has proven to be especially advantageous, since this signal effectively simulates the course of the combustion. In particular, the same applies to a combustion-chamber pressure sensor.

In addition to the signals of these sensors, variables derived from these sensors signals may also be used for the correction.

DETAILED DESCRIPTION

Figure 1:
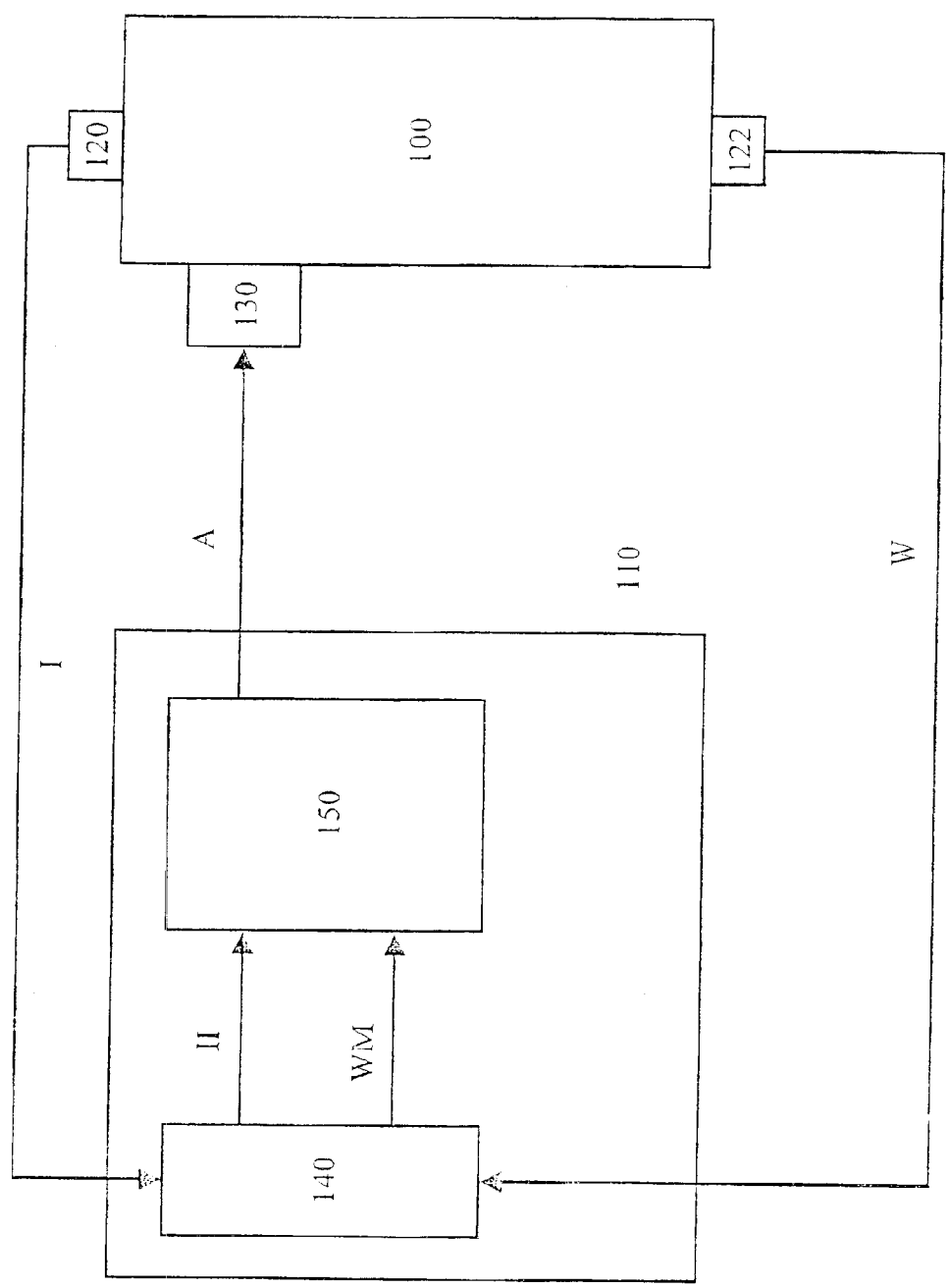
FIG. 1 shows a block diagram of a device for implementing an example method of the present invention.

An exemplary procedure according to the present invention is represented in FIG. 1. An internal combustion engine is denoted by 100. At least one sensor 120 and one angular-position sensor 122 are positioned at the internal combustion engine. Sensor 120 supplies a signal I, which characterizes the current that flows through an ionic-current probe situated in the combustion chamber of the engine. A first embodiment provides just one sensor, which is positioned at a representative cylinder. In a second embodiment, a sensor is positioned at each cylinder of the internal combustion engine, each sensor emitting a signal.

Angular-position sensor 122 may be positioned at the crankshaft of the engine and supplies a high-resolution, angular signal W concerning the angular position of the crankshaft. The angular-position sensor may alternatively be situated at the camshaft of the engine.

In addition, an actuator 130 is situated at the internal combustion engine. The actuator and the sensors are connected to a control unit 110.

Signal I of sensor 120 and signal W of angular-position sensor 122 are transmitted to an evaluation unit 140, which may form a partial unit of control unit 110. Evaluation unit 140 supplies a signal II to a functional unit 150. The functional unit applies, in turn, an actuating variable A to actuator 130.

Actuating variable A may include the control times and/or the starts of the control of an injection. An injection event of the working cycle may be divided up into a plurality of partial injections. In this context, actuating variable A is the control time and/or the start of control of at least one of the partial injections. Usually, at least one main injection, at least one pre-injection, and at least one post-injection are provided as partial injections. The procedure of the present invention is particularly advantageous in the case of pre-injection.

The characteristics of signals I of all cylinders may be measured individually. As an alternative, only one cylinder treated as representative may be provided with a signal acquisition means. In both cases, a high-resolution angular signal W is used as a reference variable, in order to calculate the angular position.

Sensor signal I and angle signal W are supplied to evaluation unit 140, which may be a component of the engine control unit. The task of the evaluation unit is to calculate a variable II, which may be supplied to a controller as an actual value.

Due to tolerances and/or aging effects in the region of the injection components, a variable amount of fuel is metered in response to the same control signal for the injection components. It is particularly problematic that, depending on tolerance and aging, a reduced fuel amount, the desired pre-injection amount, or even an augmented pre-injection can be metered in response to the same, small control time. If a pre-injection amount is supplied that is too small, then the pre-injection does not have an effect, i.e. the noises are not reduced. If a pre-injection amount supplied that is too large, then the emission levels become worse.

Therefore, the present invention provides for the control time being ascertained, in which the desired pre-injection amount is metered in. This amount is selected in such a manner, that a pre-injection occurs which has the desired influence on the combustion, but does not influence the emissions in a disadvantageous manner. To this end, the present invention provides for the control time being increased, starting out from a value of zero at which injection does hot occur. At the same time, a variable that characterizes the ignition delay is measured. The value of the control time, at which the variable that characterizes the ignition delay no longer changes in a considerable manner, is then used as a standard value. The desired pre-injection amount is metered in when this standard value is used for the control time.

The start of combustion of, in particular, the subsequent main injection may be used as a variable that characterizes the ignition delay. In this context, it is particularly advantageous when the start of combustion is indicated by the signal of an ionic-current sensor. In the case of constant operating conditions, the control time for the pre-injection may be increased in a suitable number of steps from 0 ms to a maximum value, at which an effective pre-injection occurs at all conditions. For each control time, the calculation of the start of combustion is performed based on the ionic-current signal. The values of the start of combustion may be ascertained repeatedly for the individual control times. A mean is then calculated from these values. This yields a table that assigns a start of combustion to the control times. In this context, the ignition delay corresponding to the interval between the control and the start of combustion reduces with increasing control time. The ignition delay or the start of combustion no longer changes at or above a certain control time. This control time, at which the ignition delay or the start of combustion changes into saturation, is regarded as the optimum control time for the pre-injection and used as the standard value for the control.

It is advantageous when the standard value is individually ascertained for all of the cylinders. It is particularly advantageous when the standard values are ascertained for different operating points.

Figure 2:
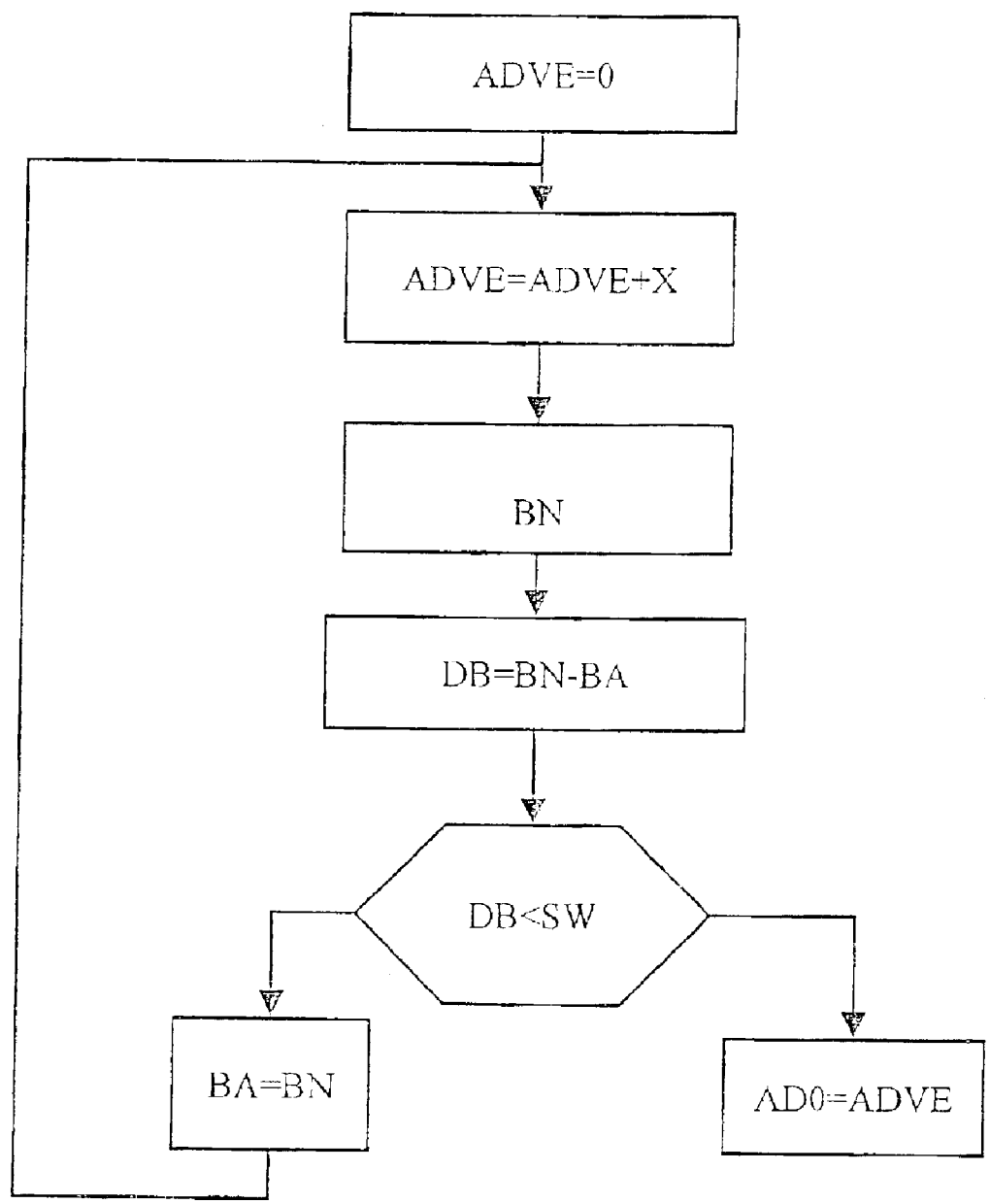
FIG. 2 shows a flowchart of an example embodiment of the method according to the present invention.

An example embodiment of the determination of standard value ADO is represented in FIG. 2. In a first step 300, the control time for the pre-injection is sent to a value at which no pre-injection occurs in all operating states. The control time may be set to 0 ms.

In step 310, control time ADVE is increased by a certain value X. Current start of combustion BN is ascertained in subsequent step 320. This may be accomplished by evaluating a signal of an ionic-current sensor. For example, the start of combustion is detected when the output signal of the ionic-current sensor exceeds a threshold value. Another signal that characterizes the start of combustion and/or the ignition delay may be detected in place of the start of combustion.

In subsequent step 330, the amount of the difference between current value BN and previous value BA of the start of combustion is ascertained as variable DB.

Subsequent interrogation 340 checks if this variable DB is less than a threshold value SW. If this is the case, i.e., the start of combustion has not changed in a considerable manner since the last change in the control time, then current control time ADVE is stored as standard value AD0 in step 360.

If interrogation 340 recognizes that variable DB is not less than a threshold value SW, then the start of combustion has changed considerably since the last change in the control time, then previous value BA is overwritten by current value BN in step 350. The control time is then increased further in step 310.

A further refinement provides for the characteristic of the pre-injection being adjusted to a certain setpoint value. This means that the time of the pre-injection is increased or decreased until the characteristic curve of the pre-injection exhibits an expected curve. In this context, the curve of the pre-injection is not adjusted directly, but rather a replacement variable that is in good correlation with the curve is adjusted to the setpoint value. In this context, the replacement variable is selected to minimize the noise emissions and the exhaust-gas emissions. This procedure allows pre-injection-amount errors, which are based on aging effects and/or manufacturing tolerances of the engine and/or the injection system, to be corrected during engine operation. In addition, this adaptation may be carried out for all operating points, i.e. for different rail pressures, engine speeds, and loads.

Figure 3A:
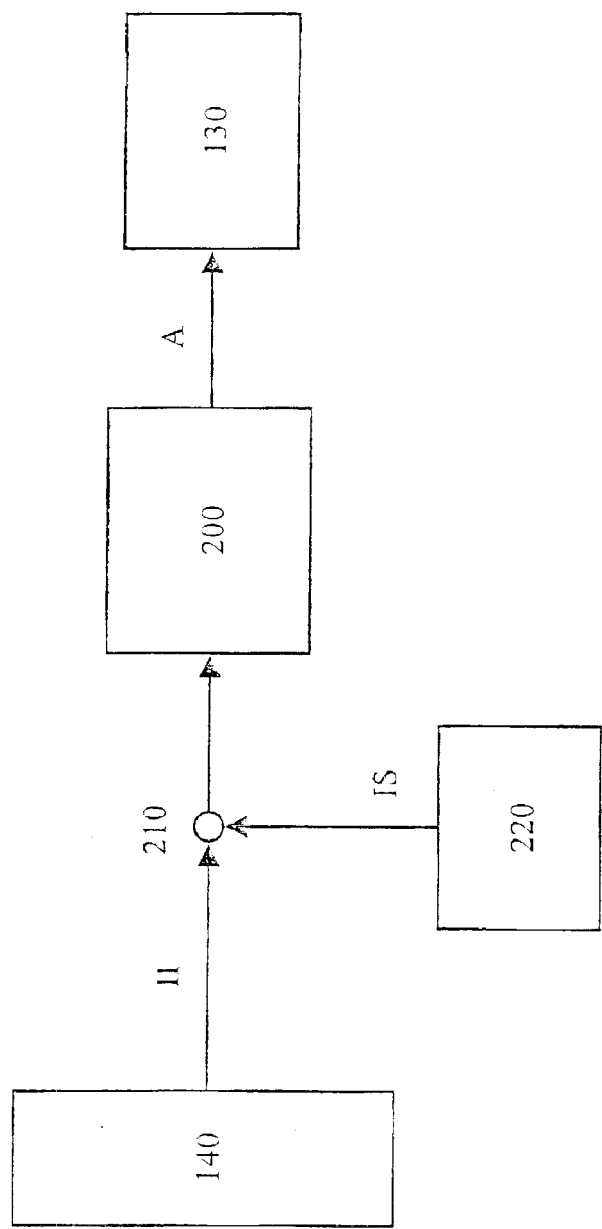
FIG. 3a shows an example closed-loop control structure according to the present invention.

An example of such control is shown in FIG. 3a. This control system is preferably a part of functional unit 150. Elements which have already been described in FIG. 1 are denoted by corresponding reference symbols. Evaluation unit 140 provides an actual value II to node 210. A setpoint value IS provided by a setpoint selection means 220 is transmitted to the second input of node 210. The output signal of node 210 is received by a controller 200, which in turn transmits control signals A to the first input and/or actuator 130.

Figure 3B:
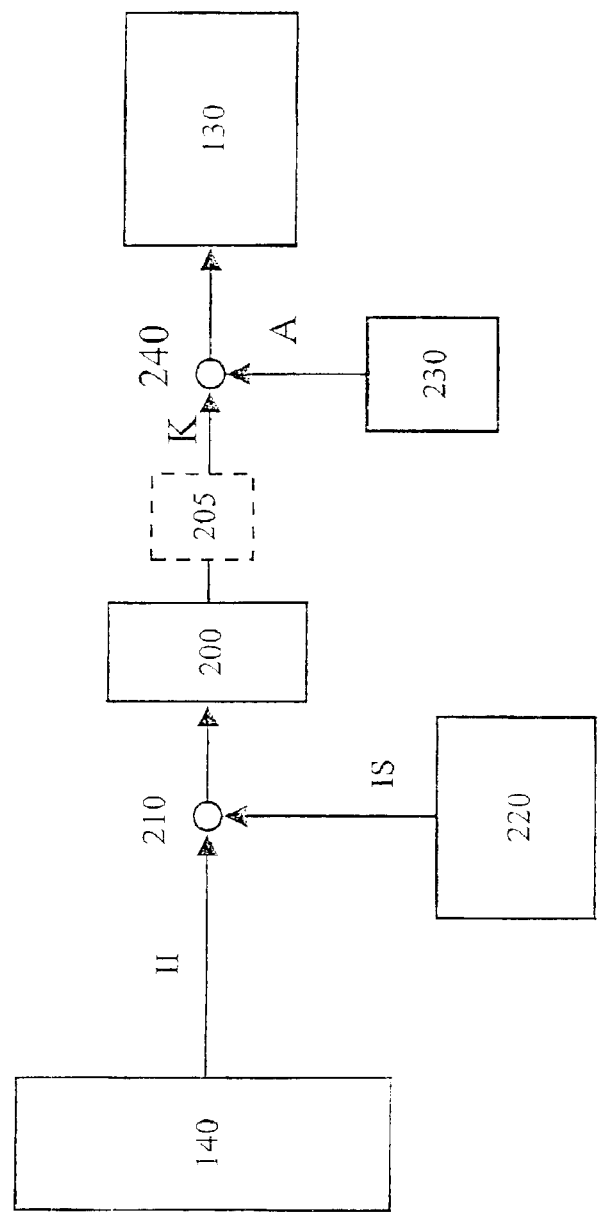
FIG. 3b shows another example closed-loop control structure according to the present invention.

In one embodiment, controller 200 transmits a correction value for correcting control time A for the pre-injection. A corresponding embodiment is shown in FIG. 3b. Elements which have already been described in FIG. 3a are denoted by corresponding reference symbols. This specific embodiment differs from that of FIG. 3a, in that control time A for the pre-injection may be specified by a setpoint selection means 230 as a function of different operating parameters. At node 240, the value A selected in this manner is then additively and/or multiplicatively corrected, using output value K of controller 200.

In this context, is particularly advantageous when correction value K may be stored in a storage means 205. In the case of a malfunction of the ionic-current sensor and/or in operating states in which no control is possible, this allows a correction to be made, using stored values K. This specific embodiment is represented by a dashed line.

According to the present invention, a pre-injection amount is adjusted to a setpoint value, using a replacement signal. The setpoint value for the replacement signal of this control system is selected in such a manner, that the pre-injection amount is as large as necessary to limit the noise emissions. On the other hand, the setpoint value of the replacement signal is selected to make the pre-injection amount so small that the exhaust-gas emissions that occur are as low as possible.

In this manner, the existing conflict of aims in the application of the pre-injection amount, between increasing noise emissions that occur when the pre-injection amount is too small, and increasing emissions, above all particles, that occur when the pre-injection amount is too large, may be defused. Consequently, a contribution may be made towards both narrowing the deviation of the emissions in the new and aged state and reducing the overall emissions, without changing the noise level of a vehicle. Therefore, such a function represents an optimization of the pre-injection.

It is especially advantageous when the above-described procedure is followed for each cylinder. This means that the control system adjusts each individual combustion occurrence of each cylinder to the input setpoints during continuous operation.

An ionic-current sensor, whose signal is produced on the basis of the negatively charged particles (electrons) and positively charged particles formed during the combustion, and the associated conductivity, may be used as a sensor. The ionic current usually increases at the start of combustion. The increase of the ionic current characterizes the start of combustion.

The time of the start of combustion of the main injection may be ascertained on the basis of the output signal of the ionic-current sensor. The start of combustion corresponds to the time, when the output signal of the ionic-current sensor rises above a specific threshold value. The interval between the start of injection and the start of combustion is referred to as the ignition delay.

The present invention provides for the ignition delay and/or the start of combustion being adjusted to a specific value. If the control time is slowly increased from the value of zero, then the ignition delay markedly decreases during the main injection, as long as the control time reaches a value at which a pre-injection occurs. If the control time is further increased, then the ignition delay decreases further. The ignition delay stops decreasing at a certain control time.

According to the present invention, the ignition delay is adjusted to the value at which the ignition delay no longer changes. As an alternative to ignition delay, the start of combustion of the main injection may also be adjusted to a specific value.

Alternatively, and/or in addition, other sensors providing signals that characterize the combustion may also be used in place of the ionic-current sensor. In particular, combustion-chamber pressure sensors, direct-contact vibration sensors, and optical sensors may be used. Furthermore, variables derived from these sensor signals or calculated from these signals may be used as actual value II.

In addition to the ionic-current signal, the combustion-chamber pressure signal has also turned out to be a particularly suitable variable. In particular, the cylinder-pressure signal differentiated with respect to time and/or with respect to the crank angle directly and indirectly contains additional information about the type of energy conversion and its effect on the engine performance, e.g., with respect to the combustion noise or loading of the piston rings.

An evaluation of the pressure signal may be carried out with respect to the feature variable, pressure gradient GP, which may be accomplished by differentiation with respect to angle W according to the formula dP/dW, or by differentiation with respect to time t according to the formula dP/dt. In particular, an absolute maximum pressure gradient or several relative maximum pressure gradients and their positions are determined.

The maximum pressure increase occurring in a cylinder substantially influences the combustion noise and, thus, the overall noise emissions of the internal combustion engine as well. Indeed, the application of the setpoint values in a conventional engine control unit can also indirectly take into account the adherence to certain limiting values of the target variable of combustion noise, as well. However, because of various effects, an individual engine, including its injection device, deviates from the setpoint values of maximum pressure gradient ab, which are consequently only selected in an indirect manner. In particular, these effects are: the sum of all the tolerances, wear and aging effects, and operating conditions not taken into account or not adequately taken into account in the setpoint values.

Alternatively or in addition, a single variable or several variables determined on the basis of the measured pressure characteristic are used as features proportional to the combustion noise.

Such variables include the maximum values and/or angular position of higher derivatives, in particular the second derivative, of the cylinder-pressure curve with respect to the crank angle and/or time.

In addition, the thermodynamic feature variables to be calculated from the pressure curve, such as the heat curve, the combustion curve, the cumulative heat curve and/or the cumulative combustion curve, may be suitable.

The heat curve indicates the energy transmitted by the combustion to the working gas, versus the crank angle. The unit of the heat curve is normally [J/° KW] or corresponding conversions. The combustion curve represents an analogous variable. However, in contrast to the heat curve, the combustion curve includes the entire heat released during combustion. Therefore, the combustion curve is greater than the heat curve by the amount of heat flowing through the combustion-chamber walls per unit angle.

Using the first law of thermodynamics, the heat curve and/or the combustion curve can be calculated from the cylinder-pressure characteristic with the aid of certain model assumptions, when caloric data about the combustion gas and fuel and data about the engine geometry are known.

According to the above-mentioned definitions of the heat curve, the cumulative heat curve represents the integral of the curve of the heat versus the crank angle. The cumulative combustion curve corresponds to the integral of the curve of combustion versus the crank angle.

Further variables include the maximum values and/or their angular positions of various derivatives, in particular the first derivative and the second derivative of the above-mentioned variables, such as the heat curve, combustion curve, cumulative heat curve, or the cumulative combustion curve, with respect to the crank angle or time.

In addition, other variables are calculated from a combustion curve model. These are, in particular, variables that characterize the injection-mass curve, such as the mass of fuel injected up to the start of combustion, or the maximum value of the injection curve. The value of the minimum of the heat represents one measure of the mass of fuel injected up to the start of combustion.

The combustion curve is determined with the aid of a model that includes a thermodynamic analysis of the combustion chamber. A significant measured variable is the cylinder pressure. If, for example, the introduction of the fuel into the combustion chamber, which corresponds to the mass flow into the combustion chamber, and the subsequent evaporation, which corresponds to the flow of heat, are not modeled, then the combustion curve calculated from the cylinder-pressure curve displays a characteristic minimum at the start of injection.

In an example embodiment, the amount of energy of this minimum is converted into a proportional injection mass $\Delta mB$. $|QBmin|=\Delta mB*r$, where r is the specific heat of vaporization of the fuel.

If the model for calculating the combustion curve also includes a partial model for the introduction and evaporation of the fuel, then data that allow the injection curve to be reconstructed are required as measured variables. In the case of a common-rail system, at least the rail pressure and the control time, supplemented by geometric parameters of the injection system, may be considered for this. In injection systems that are completely or partially operated by cams, the engine speed may be considered in place of the rail pressure. In both cases, it is advantageous to consider the measured variable of fuel temperature.

What is claimed is:

1. A method for controlling an internal combustion engine, comprising:

increasing a control time for a first partial injection from a value of zero at which injection does not occur;

measuring a first variable characterizing an ignition delay; and determining a limit value of the control time at which the first variable no longer changes in a considerable manner.

2. The method according to claim 1, wherein the first variable characterizes a start of combustion.

3. The method according to claim 1, wherein the first partial injection includes a pre-injection.

4. The method according to claim 1, further comprising:
calculating the first variable on the basis of at least one of a signal of an ionic-current sensor and a signal of a combustion-chamber pressure sensor.

5. The method according to claim 1, wherein one of the following:
   a) the first variable characterizes a pressure in a combustion chamber of at least one cylinder; and
   b) the first variable is derived from a variable characterizing the pressure in the combustion chamber of the at least one cylinder.

6. A device for controlling an internal combustion engine, comprising:
   an arrangement for increasing a control time for a first partial injection starting out from a value of zero at which injection does not occur;
   an arrangement for measuring a first variable that characterizes an ignition delay; and
   an arrangement for determining a limit value of the control time at which the first variable no longer changes in a considerable manner.

* * * * *